United States Patent Office 3,020,204
Patented Feb. 6, 1962

3,020,204
PROCESS FOR PREPARING AUGMENTATIVE
INTRINSIC FACTOR CONCENTRATE
Leon Ellenbogen, New City, and Samuel R. Hawkins, Pearl River, N.Y., assignors to American Cyanamid Company, New York, N.Y., a corporation of Maine
No Drawing. Filed May 11, 1960, Ser. No. 28,237
4 Claims. (Cl. 195—2)

This invention relates to an improved process for producing augmentative intrinsic factor concentrate of high potency from animal tissue containing intrinsic factor activity.

Intrinsic factor is a component of normal human gastric juice which is involved in the utilization of vitamin $B_{12}$. In the classical condition in which a deficiency of intrinsic factor is found, namely pernicious anemia, small oral doses of vitamin $B_{12}$ are ineffective unless a source of intrinsic factor is administered simultaneously. The study of gastric intestinal absorption with radioactive vitamin $B_{12}$ in pernicious anemia patients and healthy individuals has proven that intrinsic factor is essential for this absorption. Although hematopoietic responses in pernicious anemia may follow the oral administration of massive doses of vitamin $B_{12}$ given without the intrinsic factor, the absorption of the vitamin, when amounts comparable to those found in an average diet are ingested, involves a participation of intrinsic factor.

Heretofore various intrinsic factor preparations have been utilized in the treatment of pernicious anemia, but most of them have suffered from the defect of requiring the patient to swallow objectionably large quantities of unpleasant material. For example, the average daily requirement of whole hog duodenum by a pernicious anemia patient is about one-fourth to one-half pound, and even when desiccated at least 20 to 40 grams are required. Various efforts have been made to improve this situation by attempting to prepare more concentrated intrinsic factor preparations and this has resulted in concentrates which are therapeutically adequate in daily quantities of as low as 20 mg. For example, in U.S. Patent No. 2,848,367 to Williams et al. there is described a process for preparing intrinsic factor concentrate having such potency that 30 mg. equals one daily dose. This product also has an augmentative effect which had not hitherto been obtained. The intrinsic factor concentrates which had been produced before tended to inhibit the uptake of vitamin $B_{12}$ by healthy individuals, although useful in combatting pernicious anemia. Unexpectedly, the augmentative intrinsic factor concentrate of Williams et al. does not have this undesirable effect but increases the uptake of vitamin $B_{12}$ in healthy individuals as well as in those suffering from pernicious anemia. Furthermore, in U.S. Patent No. 2,912,360 to Baum et al. there is described a process for preparing intrinsic factor concentrate by means of digesting animal tissue containing intrinsic factor activity with proteolytic enzymes obtained from mammalian sources. The process of Baum et al. employs proteolytic enzymes such as pancreatin, chymotrypsin, trypsin, and carboxypeptidase whereby there is obtained intrinsic factor concentrates having such potency that 20 to 50 mg. equals one daily dose.

Our invention is based upon the discovery that augmentative intrinsic factor concentrate of high therapeutic potency may be prepared in superior yield by digesting animal tissue containing intrinsic factor activity in an aqueous medium with the proteolytic enzyme obtained by propagation of fungi of the order Entomophthorales upon suitable culture media; removing the insoluble, undigested solid material therefrom; and recovering from the aqueous fraction intrinsic factor in concentrated form by evaporating the remaining aqueous solution to dryness.

The proteolytic enzyme employed in the novel process of the present invention is an amorphous powder obtained by propagation of a wide variety of phycomycetous fungi of the order Entomophthorales upon suitable culture media. The order comprises a single family, the Entomophthoraceae which includes six genera: Entomophthora, Basidiobolus, Conidiobolus, Completoria, Massaspora, and Ancylistes. Although this proteolytic enzyme may be produced by any member of the order, the following species are preferred: *Entomophthora apiculata*, *Entomophthora coronata*, *Basidiobolus ranarum*, *Conidiobolus frefeldianus* and *Conidiobolus villosus*. It has further been found that the fungi *Entomophthora apiculata*, *Conidiobolus frefeldianus* and *Entomophthora coronata* are most suitable because of the high yields of enzyme obtained. The preparation and properties of this proteolytic enzyme employed in the novel process of the present invention are adequately described in U.S. Patent No. 2,936,265 to Whitehill et al. In addition, in U.S. Patent No. 2,927,060 to Oringer there is described a process for refining this proteolytic enzyme.

The starting material for the novel process of this invention may be any intrinsic factor-bearing tissue, such as hog stomach and hog duodenum. However, better results are obtained with the mucosa of the duodenum or stomach, i.e., the inner lining thereof. The stomach mucosa consists of three portions, i.e., cardiac, fundus and pylorus, and an especially concentrated intrinsic factor substance may be prepared from the pyloric mucosa of hog stomach.

Preparatory to digesting the intrinsic factor-bearing tissue, it is preferred to comminute the tissue by grinding or by mincing with an ax or knife. Also, the fresh intrinsic factor-bearing tissue may be frozen and then ground to prevent any possibility of loss in intrinsic factor activity.

The digestion of the animal tissue containing intrinsic factor is carried out at a temperature optimal for the activity of the proteolytic enzyme such as a temperature in the range of from 15° C. to 40° C., preferably about 25° C., and at a pH range in which the enzyme has substantially maximal activity. The pH range generally is about pH 6.5–7.5 but preferably is about pH 7.0. The pH adjustment may be made with an alkali metal hydroxide or carbonate or an alkaline earth metal hydroxide or carbonate such as sodium hydroxide, potassium hydroxide, calcium hydroxide, sodium bicarbonate, potassium bicarbonate, sodium carbonate, potassium carbonate, etc.

The intrinsic factor is believed to be bound by or in some way associated with some component of the protein substrate, and a precise value for the amount of intrinsic factor contained by an particular protein source of that factor cannot presently be determined. Therefore, digestion is carried out at least long enough to liberate substantial amounts of the intrinsic factor from the substrate. The duration of the digestion may range from about one to four hours or more. In general, a digestion period of about two and one-half hours yields satisfactory results. It will be understood that longer digestion may increase the yield of intrinsic factor, but that the duration of digestion must be chosen with regard to practical considerations, such as optimum yield and purity with the equipment and facilities available. Furthermore, it has been found that agitation of the digestion mixture during the digesting step is advantageous.

The ratio of aqueous medium to animal tissue containing intrinsic factor may range from 2:1 parts by weight to 6:1 parts by weight, preferably about 4:1 parts by weight. The amount of the proteolytic enzyme employed in the novel process of the present invention may range from 0.1 g. to 10.0 g. of enzyme per 100 g. of animal tissue, but preferably an amount of about 1.0 g. of enzyme per 100 g. of animal tissue is employed.

After the digestion has been carried out, the separation of the insoluble solid material from the aqueous digestion mixture to provide an aqueous solution containing the intrinsic factor may be carried out by a simple filtration step or by centrifuging. The drying of the aqueous solution containing the intrinsic factor may then be carried out either by spray drying or by lyophilizing. It has been found that drying the aqueous solution containing the intrinsic factor by lyophilization is somewhat more advantageous than spray drying.

The three steps of the improved process of the present invention produce a dry, free-flowing augmentative intrinsic factor concentrate as a powder which has excellent stability and a therapeutic potency such that adequate hematopoietic response in pernicious anemia patients is produced when administered at dosage levels as low as 15 mg. per day with a suitable amount of vitamin $B_{12}$. Not only does the improved process of the present invention produce intrinsic factor concentrate which is augmentative but, surprisingly, higher yields are obtained than with proteolytic enzymes obtained from mammalian sources.

The augmentative intrinsic factor concentrate as prepared by the novel process of the present invention can be administered in the form of the usual pharmaceutical preparations such as in capsules, tablets, and the like, bearing in mind the labile nature of the intrinsic factor in such preparations.

The invention will be described in greater detail in conjunction with the following specific examples.

*Example 1*

In a suitable tank provided with means for heating, cooling, and agitation were placed 452 kg. of tap water and 113 kg. of hog pyloric mucosa. The hog pyloric mucosa had been ground, while frozen, in an ordinary meat grinder through a plate having 7/64 inch holes. The pH of the digestion mixture was then adjusted to about 7.0 using 5 N sodium hydroxide. In 11.0 l. of tap water was dissolved 1,130 g. of the proteolytic enzyme obtained by propagation of the fungus *Conidiobolus brefeldianus* upon suitable culture media, and this solution was added to the digestion mixture. The digestion mixture was agitated to keep the mixture in suspension, and the temperature was established at 25° C. Digestion was continued at 25° C. for two and one-half hours and then the insoluble solid materials were removed from the digestion mixture by centrifuging. The residual aqueous solution containing the intrinsic factor was then frozen, and dried from the frozen state in vacuo at a maximum temperature of about 30° C. There was thus obtained a dry, free-flowing augmentative intrinsic factor concentrate as a powder of very low moisture content and high bulk density.

The above process may be carried out with equal facility by employing the proteolytic enzyme as elaborated by one of the fungi *Entomophthora apiculata, Entomophthora coronata, Basidiobolus ranarum,* or *Conidiobolus villosus.*

*Example 2*

Five kilograms of ground frozen hog pyloric mucosa was suspended in 20 liters of tap water. The pH of the resulting digestion mixture was 6.6. The digestion mixture was agitated to keep the solids in suspension, and digestion was thus continued at 10°–12° C. for one and one quarter hours. The insoluble solids were removed from the digestion mixture by filtering through cheesecloth. The filtrate was then spray-dried whereby there was obtained 292 g. of a control sample of intrinsic factor concentrate.

Five kilograms of ground frozen hog pyloric mucosa was suspended in 20 liters of tap water. The pH of the resulting digestion mixture was adjusted to 7.0 with 1 N sodium hydroxide, and then 50 g. of the proteolytic enzyme obtained by propagation of the fungus *Conidiobolus brefeldianus* upon suitable culture media was added to the digestion mixture. The digestion mixture was agitated to keep the solids in suspension, and digestion was thus continued at 20°–25° C. for two and one-half hours. The insoluble solids were removed from the digestion mixture by filtering through cheesecloth. The filtrate was then spray-dried whereby there was obtained 523 g. of augmentative intrinsic factor concentrate.

The potency of the control sample of intrinsic factor concentrate and of the augmentative intrinsic factor concentrate prepared by the novel process of the present invention were determined in the following manner. Oral doses of 2 $\mu$g. of vitamin $B_{12}$ ($Co^{60}$) were administered to each of two pernicious anemia patients at 3 to 4 day intervals. Concurrently, equal amounts by weight of the control sample of intrinsic factor concentrate were fed to one patient, and of the augmentative intrinsic factor concentrate prepared by the novel process of the present invention were fed to the other patient. A urinary excretion assay indicated that the one patient excreted 11.2% of the vitamin $B_{12}$ administered concurrently with the control sample of intrinsic factor concentrate, whereas the other patient excreted 12.2% of the vitamin $B_{12}$ administered with the augmentative intrinsic factor concentrate prepared by the novel process of the present invention. This data indicates that the control sample and the sample prepared by the novel process of the present invention had approximately the same potency. However, the yield of augmentative intrinsic factor concentrate prepared by the novel process of the present invention is almost double the yield of control sample prepared by the ordinary process of the prior art.

What is claimed is:

1. The process for the preparation of augmentative intrinsic factor concentrate having high potency which comprises digesting animal tissue containing intrinsic factor activity in an aqueous medium containing a proteolytic enzyme elaborated by a fungus selected from the group consisting of the species *Entomophthora apiculata, Entomophthora coronata, Basidiobolus ranarum, Conidiobolus brefeldianus* and *Conidiobolus villosus;* separating out the insoluble solid material from the aqueous digested mixture to provide an aqueous solution containing intrinsic factor; and drying said aqueous solution to provide a high potency augmentative intrinsic factor concentrate.

2. A process according to claim 1 in which the digesting of the animal tissue is effected at a temperature of from 15° C. to 40° C.

3. A process according to claim 2 in which the aqueous medium has a pH of from about 6.5 to about 7.5.

4. A process according to claim 3 in which the aqueous medium to animal tissue ratio is from 2:1 parts by weight to 6:1 parts by weight.

References Cited in the file of this patent

UNITED STATES PATENTS

| | | |
|---|---|---|
| 2,910,405 | Robbins | Oct. 27, 1959 |
| 2,912,360 | Baum et al | Nov. 10, 1959 |
| 2,927,060 | Oringer | Mar. 1, 1960 |
| 2,936,265 | Whitehill | May 10, 1960 |